(12) United States Patent
Lee et al.

(10) Patent No.: US 12,744,815 B2
(45) Date of Patent: Sep. 22, 2026

(54) REGULAR EXPRESSION RULE GROUPING BALANCER

(71) Applicant: International Business Machines Corporation, Armonk, NY (US)

(72) Inventors: Eun Kyung Lee, Bedford Corners, NY (US); Lars Schneidenbach, Bedford Hills, NY (US); Tsung-Nan Lin, Taipei City (TW); Hong-Yen Chen, Taipei City (TW); Pang-Cheng Wu, Kaohsiung City (TW)

(73) Assignees: International Business Machines Corporation, Armonk, NY (US); National Taiwan University, Taipei (TW)

( * ) Notice: Subject to any disclaimer, the term of this patent is extended or adjusted under 35 U.S.C. 154(b) by 323 days.

(21) Appl. No.: 18/242,932

(22) Filed: Sep. 6, 2023

(65) Prior Publication Data

US 2025/0080583 A1 Mar. 6, 2025

(51) Int. Cl.
*H04L 9/40* (2022.01)
*H04L 43/028* (2022.01)

(52) U.S. Cl.
CPC ............ *H04L 63/20* (2013.01); *H04L 43/028* (2013.01); *H04L 63/1416* (2013.01); *H04L 63/1425* (2013.01)

(58) Field of Classification Search
CPC ... H04L 63/20; H04L 63/028; H04L 63/1416; H04L 63/1425

(Continued)

(56) References Cited

U.S. PATENT DOCUMENTS 8,756,170 B2 6/2014 Chen et al.
9,426,166 B2 8/2016 Billa et al.

(Continued)

FOREIGN PATENT DOCUMENTS

CN 101201836 B 4/2010
CN 106878289 A 6/2017

(Continued)

OTHER PUBLICATIONS

He, Gang et al., "A Regular Expression Grouping Algorithm Based on Partitioning Method", Proceedings—2012 3rd IEEE International Conference on Network Infrastructure and Digital Content, IC-NIDC 2012, Sep. 2012, 4 pages.

(Continued)

*Primary Examiner* — Kevin S Mai
(74) *Attorney, Agent, or Firm* — Cantor Colburn LLP; Anthony Mauricio Pallone

(57) ABSTRACT

Mechanisms are provided for intrusion detection based on regular expression matching. The mechanisms partition a regular expression (RegEx) rule set into a plurality of different partitions and distributes the plurality of different partitions to a plurality of different edge computing devices associated with a protected network of computing resources. The mechanisms route data packets of an incoming data stream to the plurality of edge computing devices, each of which processes the data packets to determine whether the data packets match RegEx rules in a partition distributed to the edge computing device. A determination is made as to whether the incoming data stream represents an intrusion based on a combination of results of the processing of the data packets by the plurality of edge computing devices.

17 Claims, 5 Drawing Sheets

(58) Field of Classification Search
USPC .............................................................. 726/1
See application file for complete search history.

(56) References Cited

U.S. PATENT DOCUMENTS

| | | | | |
|---|---|---|---|---|
| 9,858,051 | B2 | 1/2018 | Goyal et al. | |
| 10,635,419 | B2 | 4/2020 | Yang et al. | |
| 2005/0278783 | A1* | 12/2005 | Chien | H04L 63/145 726/22 |
| 2010/0325633 | A1* | 12/2010 | Eguro | G06F 9/4881 718/103 |
| 2014/0040261 | A1* | 2/2014 | Horne | G06F 16/90344 707/E17.039 |
| 2015/0355891 | A1* | 12/2015 | Angerer | G06F 17/00 717/151 |
| 2019/0171612 | A1* | 6/2019 | Shahar | G06F 15/167 |
| 2021/0365802 | A1* | 11/2021 | Sofer | G06F 16/2453 |

FOREIGN PATENT DOCUMENTS

| | | | |
|---|---|---|---|
| CN | 107193623 | A | 9/2017 |
| EP | 1960913 | B1 | 11/2017 |

OTHER PUBLICATIONS

Liu, Tingwen et al., "Towards Fast and Optimal Grouping of Regular Expressions via DFA Size Estimation", IEEE Journal on Selected Areas in Communications, vol. 32, No. 10, Oct. 2014, 13 pages.

Xu, Chengcheng et al., "Exploring efficient grouping algorithms in regular expression matching", PloS one, vol. 13, No. 10, Oct. 2018, 14 pages.

Yu, Fang et al., "Fast and Memory-Efficient Regular Expression Matching for Deep Packet Inspection", Proceedings of the 2006 ACM/IEEE Symposium on Architecture for Networking and Communications Systems, ANCS 2006, Dec. 3-5, 2006, 10 pages.

* cited by examiner

REGULAR EXPRESSION RULE GROUPING BALANCER

BACKGROUND

The present application relates generally to an improved data processing apparatus and method and more specifically to an improved computing tool and improved computing tool operations/functionality for balancing regular expression groups, such as for nondeterministic finite automatons.

An automaton is a self-operating machine, or control mechanism, designed to follow a sequence of operations, or respond to predetermined instructions. In computer technology, an automaton is a self-propelled computing device which follows a predetermined sequence of operations automatically. An automaton with a finite number of states is called a Finite Automaton (FA) or Finite-State Machine (FSM). An FSM is often represented as a state diagram consisting of states (typically represented by circles) and transitions (represented by arrows). As the automaton sees an input symbol, it transitions to another state according to its transition function, which takes the previous state and the current input symbol as its arguments.

A deterministic finite automaton (DFA) is a type of FSM in which each of its transitions are uniquely determined by its source state and the input symbol, and in which reading an input symbol is required for each state transition. Nondeterministic finite automatons (NFAs), or nondeterministic finite-state machines, are automata that have a finite number of states and can transition to more than one next state given an input symbol. With an NFA, for each input symbol, the NFA transitions to a new state until all input symbols have been consumed. In each step, the automaton non-deterministically chooses one of the applicable transitions. If there is at least one sequence of choices leading to an accepting state after completely consuming the input, it is accepted. Otherwise, if no chosen sequence can consume all the input and lead to an accepting state, the input is rejected.

Alternatively, one can represent the functioning of an NFA as consuming a string of input symbols, one by one, and at each step, whenever two or more transitions are applicable, the NFA clones itself into an appropriate number of copies, each following a different transition. If no transition is applicable, the current copy is in a dead end and is discarded. If after consuming the complete input, any of the copies is in an accept state, the input is accepted; otherwise, it is rejected.

One area in which finite state machines have been applied is the area of intrusion detection in computing systems. That is, an intrusion detection system (IDS) may utilize FSMs to perform pattern matching to determine whether a data stream is likely an unauthorized intrusion or attack. However, as new intrusion patterns and attacks are discovered, ever increasing size FSMs are required to detect these intrusions and attacks, which requires a large amount of memory, data storage, and processing resources to implement.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for intrusion detection based on regular expression matching. The method comprises partitioning a regular expression (RegEx) rule set into a plurality of different partitions and distributing the plurality of different partitions to a plurality of different edge computing devices associated with a protected network of computing resources. The method further comprises routing data packets of an incoming data stream to the plurality of edge computing devices. Each edge computing device in the plurality of edge computing devices, processes the data packets to determine whether the data packets match RegEx rules in a partition distributed to the edge computing device. Moreover, the method comprises determining whether the incoming data stream represents an intrusion based on a combination of results of the processing of the data packets by the plurality of edge computing devices. Thus, the illustrative embodiments provide mechanisms for distributing partitions of RegExes such that the processing of data packets of data streams for detecting intrusions may be offloaded to edge computing devices even with their limited memory and data storage capacity.

In some illustrative embodiments, partitioning the RegEx rule set comprises determining a number of states in each RegEx rule of the RegEx rule set, predicting a number of saved states that may be saved by compiling at least two RegEx rules in the RegEx rule set together, and generating partitions based on the number of states in each RegEx rule and the number of saved states. In some illustrative embodiments, the partitioning further comprises generating a weighted graph based on the number of states and number of saved states, and applying at least one optimization algorithm to the weighted graph to generate the plurality of different partitions. In some illustrative embodiments, the at least one optimization algorithm comprises at least one of a genetic optimization algorithm or an ant colony optimization algorithm. Thus, the partitioning may be optimized to reduce the size of the RegEx rules in each partition based on an estimate of a number of saved states that may be obtained from combining RegExes into the same partition.

In some illustrative embodiments, for each RegEx in the RegEx rule set, pseudo-randomly matching a string to the RegEx, to thereby generate a set of one or more strings for each RegEx rule. In some illustrative embodiments, predicting the number of saved states comprises, for each pairing of a RegEx rule in the RegEx rule set to each other RegEx rule in the RegEx rule set, computing a length of a longest common sequence, and wherein the number of saved states comprises an average length of the lengths of the longest common sequences. In this way, an estimate of the savings of state processing may be determined based on how much in common the strings have with one another and partitioning of the RegExes may be generated that maximizes the state savings.

In some illustrative embodiments, generating a number of states comprises building a nondeterministic finite automaton (NFA), performing a state reduction operation on the NFA, and determining a number of states of the NFA after performance of the state reduction operation. In some illustrative embodiments, the partitions in the plurality of different partitions are generated to have a size that fits within a memory or data storage capacity of the edge computing devices. In some illustrative embodiments, the edge computing devices are smart network interface cards.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

As noted above, one application of finite state machines (FSMs) is with intrusion detection systems (IDS) that operate to detect potential unauthorized access or attacks on one or more protected computing systems. The IDS is a computing system that operates to monitor incoming data streams to one or more other computing systems/devices, a network of computing systems/devices, or the like, and determines whether those data streams follow a predetermined security policy, i.e., are indicative of an intrusion, attack, or other unwanted or unauthorized access attempt. One way to determine whether the data streams are likely an intrusion or attack is to perform a pattern matching of content of the data packets in the data stream to known or predetermined patterns. An IDS may employ Regular Expressions (RegExes) and a RegEx engine to perform such pattern matching, as part of a deep packet inspection (DPI), on text of the incoming data streams and thereby detect intrusions that do not follow the established security policies, or which match a given pattern indicative of an intrusion, attack, or other unwanted or unauthorized access attempt.

RegExs are a way to describe a pattern for matching or manipulating text by using both regular and special characters that have a special meaning to the RegEx engine. For example, a regex may be of the type "/h[aeiou]+/g" which indicates a pattern of characters starting with "h" and including any pattern of the vowel characters "aeiou". Text that may match such a pattern may be the words "the", "heaven", "without", "there", "that", etc. It should be appreciated that such patterns need not be specific to human readable text, and may be any text patterns, such as computer understandable programming languages or the like. DPI logic of an IDS may utilize such regular expressions in regular expression based rules for detecting whether one or more incoming data packets of a data stream match patterns of content that indicate the data packets are, or are part of, an unauthorized intrusion or attack on the protected physical and/or logical computing resources, e.g., the computer systems/devices, network devices and resources, stored data, etc.

Figure 1:
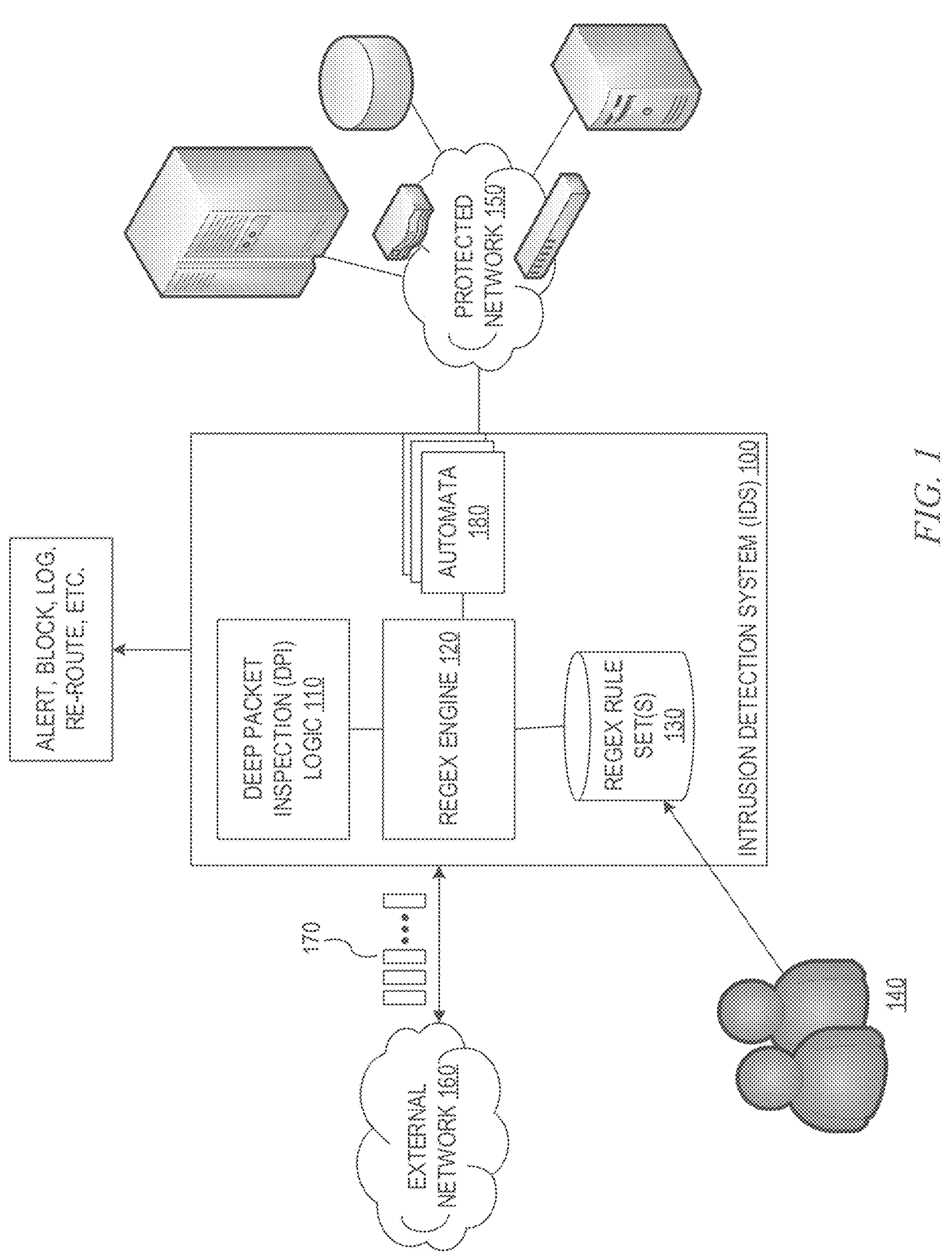
FIG. 1 is an example diagram illustrating the operation of an intrusion detection system (IDS) employing a regular expression based rules and a regular expression (RegEx) engine.

FIG. 1 is an example diagram illustrating the operation of an intrusion detection system (IDS) employing regular expression based rules and a regular expression (RegEx) engine. As shown in FIG. 1, the IDS 100 includes deep packet inspection (DPI) logic 110 and RegEx engine 120 employing RegEx based rules 130. The RegEx based rules 130 may be rules generated by one or more authorized users 140 based on recognized threats and intrusion patterns. The IDS 100 protects resources of a protected network 150 of computing resources, which may be physical computing resources, e.g., computing systems/devices, pass-through devices, Internet of Things (IoT) devices, etc., and/or logical computing resources, e.g., data structures, applications, and the like. The IDS 100 may analyze network traffic, i.e., data packets and data streams, on the protected network 150 and/or incoming or even outgoing from the protected network 150, such as from external network 160.

As shown in FIG. 1, assuming analysis of an incoming data stream from the external network 160 as an example, as data 170 is received at the protected network 150, a server computing device implementing the IDS 100 executes the DPI logic 110 and RegEx engine 120 on the incoming data packets of the incoming data stream 170. The DPI logic inspects in detail the data packets being sent over the computer network(s) 150, 160 and takes appropriate actions in response to determining whether the details of the data packets indicate potential threats, e.g., alerting, blocking, re-routing, and/or logging the data accordingly. The DPI logic 110 may invoke the RegEx engine 120 to perform pattern matching on the content of the data packets with regard to the predefined RegEx based rules 130. If the content of the data packets does not match any of the predefined RegEx based rules 130 that define unauthorized intrusions, attacks, or other unwanted access attempts to computing resource, then the data stream 170 may be determined to be trusted and permitted to continue flowing to the protected network 150 and its computing resources, e.g., physical/virtual devices, processes, backend data stores, etc. If the content of the data packets matches one or more of the predefined RegEx based rules 130, the data stream 170 may be considered to be malicious and the DPI logic 110 of the IDS 100 may trigger an appropriate response, e.g., transmitting an alert message to an authorized computing device of authorized personnel, blocking the data stream 170 from accessing the protected network 150, re-routing the data stream 170, e.g., to an isolated and non-essential computing resource (decoy), and/or logging the malicious activity for later evaluation.

The RegEx based rules 130 are compiled by the RegEx engine 120 into automata 180 which consists of states and a transition function. For example, in some illustrative embodiments a Thompson's construction algorithm may be used to transform a regular expression into an equivalent nondeterministic finite automaton which can be used to match strings of text to the regular expression. When determining whether an input data packet matches the RegEx patterns of a RegEx based rule 130, the RegEx based rule 130 is represented by the automata 180, the RegEx engine 120 starts with the start states and maintains a set of reachable states according to the transition function and input data. A match is found if, and only if, an accept state is reached, i.e., a state which the automata may halt in, provided it has no input left, in order to accept the input as part of the language.

The automata 180 may be a deterministic finite automaton (DFA) or nondeterministic finite automaton (NFA), where the automata 180 is either a DFA or NFA based on the transition function utilized. In the depiction of FIG. 1, the automata 180 is shown as a nondeterministic finite automaton (NFA) having multiple possible transitions from one state to one or more other states.

As new attacks and intrusion patterns are discovered, often on a daily basis, more and more RegExes and RegEx based rules 130 are needed to classify data packet payloads. The sizes of these RegExes and RegEx based rules 130, and their corresponding automata, grows similarly. This requires greater amounts of storage and memory capacity to maintain such RegExes and automata.

It is desirable to offload the processing of such DPI logic 110 and RegEx based rules 130 by a RegEx engine 120 to edge devices, e.g., non-core processors, such as smart network interface cards (NICs) or other edge devices. This will free up the core processors and host devices to perform other work and increase throughput and responsiveness of the computing resources. However, these edge devices are often storage and memory restricted, i.e., they do not have the same amount of storage space or memory resources available to core processors and host devices, e.g., servers and the like. As a result, with the increasing sizes of RegExes and RegEx based rules, and the limited storage/memory resource availability of edge devices, it is not practical to implement the RegEx engine 120 in the edge devices.

The illustrative embodiments provide an improved computing tool and improved computing tool operations/functionality to facilitate the implementation of DPI and RegEx engine logic in edge devices given the limited memory/data storage resources of these edge devices. The illustrative embodiments, instead of using deterministic finite automatons (DFAs), divides the RegExes into several groups or partitions of RegExes, and for each RegEx in a group/partition, constructs an NFA for that RegEx. The groups/partitions may then be distributed across multiple edge devices. In this way, every edge device deals with all input data packets. The RegExes are divided into disjoint sets (also referred to as groups/partitions) and each edge device handles one or more of these disjoint sets. Each edge device makes a determination as to whether there is a match of the input to the disjoint set(s) it handles, and the combination of determinations provides a final determination for detecting unauthorized intrusions/attacks.

Thus, when an input is received, the input may be submitted to each of the edge devices which operates on the input using the NFAs of the group/partition that the edge device implements, to determine if one or more of the RegExes of that group/partition are matched. The results of each edge device processing, i.e., each sub-matching result, may then be combined to generate a final matching result for the RegEx engine. The final matching result may then be provided to the DPI logic which performs the corresponding triggered actions, e.g., logging, alert generation and transmission, blocking data streams, etc. In this way, where the computation time complexity of the DFA may be O(1) and memory usage O(2^n), where n is the number of RegEx based rules (or number of states), using the NFA based on groups/partitions instead results in a computation time complexity of O(n^2) and a memory usage of O(n). While this may increase the computation time complexity, it allows the processing to be performed within memory restricted edge devices and distributed across such edge devices.

In generating the groups/partitions of RegExes, the illustrative embodiments comprise a nondeterministic finite automaton (NFA) engine, a state estimator, a string generator, an embedding model, and an intelligent optimization engine. The NFA engine operates to process an original set of RegEx based rules and generate NFA state sizes for each RegEx based rule in the RegEx rule set. The original set of RegEx based rules are also input to the string generator which, for each rule, considers the rule as a set of one or more strings by randomly/pseudo-randomly selecting strings from the RegExes of the rule, e.g., from a RegEx rule of "ab[c|d|e][f|g]" a string of "abdg" may be selected as a representative string. The representative string for each RegEx based rule may then be provided to the state estimator and embedding model.

The state estimator estimates the number of states that may be saved by compiling RegEx based rules together in a group/partition. That is, for each pair of RegExes r1, r2, their corresponding random strings generated by the string generator are s11, . . . , s1k, s21, . . . , s2k. In some illustrative embodiments, the number of states that can be saved by compiling r1 and r2 together is estimated by a function of the type $$\frac{1}{k^2}\sum_{i=1}^{k}\sum_{j=1}^{k}LCS(s_{1i}, s_{2j}),$$

where the longest common subsequence (LCS) is the longest subsequence common to all sequences in a set of sequences, e.g., s11, . . . , s1k, s21, . . . , s2k, and k is the number of strings generated from each of the RegExes.

In some illustrative embodiments, the embedding model is a computer model employing a Doc2Vec structure with a Continuous Bag of Words (CBOW) that is trained to learn how to predict a missing token using similarity. That is, the RegExes are parsed into tokens and the embedding model is trained on these tokens. This may be done for a training data set to obtain the trained embedding model which may then be applied to a new RegEx rule to generate a vector representation of the RegEx rule. The vector representation of the new RegEx rule may then be used with a vector representation of the RegEx rules present in the various groups/partitions to identify a group/partition to which to assign the new RegEx rule, such as by evaluating a vector similarity metric or distance metric, and finding the smallest distance or greatest similarity between the vectors. It should be noted that the tokens are not simply human recognizable words, e.g., English words, but may be any meaningful payload pattern.

The results generated by the NFA engine, the state estimator, and the embedding model are input to the intelligent optimization engine which generates RegEx rule partitions based on these inputs and selects an optimum partitioning of the RegEx rules such that the RegEx rules may be distributed to the various edge devices. In some illustrative embodiments, this optimization by the intelligent optimizer may apply a genetic algorithm or an ant colony algorithm to a set of RegEx rules to generate a plurality of groups/partitions of the RegEx rules. The genetic algorithm optimization and ant colony algorithm optimization are known algorithms for finding solutions given an optimization problem. In this case, the optimization problem is the partitioning of the RegEx rule set and the genetic/ant colony algorithms operate on the given set of RegEx rules to determine the optimum partitioning for distribution of the RegEx rules set across a plurality of edge devices. The RegEx rule partitions may then be distributed to the different edge devices for implementation as part of RegEx engines which evaluate input data based on their respective RegEx rule partitions.

Thus, the illustrative embodiments provide an improved computing tool and improved computing tool operations/functionality for distributing a RegEx rule set to a plurality of edge devices, e.g., smart network interface cards, that have limited memory and/or data storage capacity, by partitioning the RegEx rule set according to an estimate of the number of states that may be saved by compiling RegEx rules together and a determination of NFA state size for each RegEx rule, using RegEx rule embeddings. The edge devices apply their corresponding distinct partitions to incoming data streams, where the incoming data stream is sent to each of the edge devices. The edge devices determining matches between payload data of incoming data packets and the RegExes of their corresponding RegEx rule partition. The results from each edge device are combined in a RegEx engine or deep packet inspection (DPI) logic to determine whether any of the edge devices detect a match, i.e., a data packet has a payload matching a RegEx pattern. An appropriate action is then performed based on whether or not a match is identified, e.g., generating and transmitting an alert notification, blocking the data stream, re-routing the data stream, logging the data, etc.

Before continuing the discussion of the various aspects of the illustrative embodiments and the improved computer operations performed by the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular technological implementation for accomplishing and/or performing the actions, steps, processes, etc., attributable to and/or performed by the engine, but is limited in that the "engine" is implemented in computer technology and its actions, steps, processes, etc. are not performed as mental processes or performed through manual effort, even if the engine may work in conjunction with manual input or may provide output intended for manual or mental consumption. The engine is implemented as one or more of software executing on hardware, dedicated hardware, and/or firmware, or any combination thereof, that is specifically configured to perform the specified functions. The hardware may include, but is not limited to, use of a processor in combination with appropriate software loaded or stored in a machine readable memory and executed by the processor to thereby specifically configure the processor for a specialized purpose that comprises one or more of the functions of one or more embodiments of the present invention. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

It should be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

The present invention may be a specifically configured computing system, configured with hardware and/or software that is itself specifically configured to implement the particular mechanisms and functionality described herein, a method implemented by the specifically configured computing system, and/or a computer program product comprising software logic that is loaded into a computing system to specifically configure the computing system to implement the mechanisms and functionality described herein. Whether recited as a system, method, of computer program product, it should be appreciated that the illustrative embodiments described herein are specifically directed to an improved computing tool and the methodology implemented by this improved computing tool. In particular, the improved computing tool of the illustrative embodiments specifically provides a regular expression (RegEx) rule set partitioning system for partitioning a RegEx rule set into a plurality of partitions that can be distributed to edge devices for distributed pattern matching as part of an intrusion detection operation. The improved computing tool implements mechanism and functionality, such as the RegEx rule set partitioning and distributed processing of incoming data streams using distributed RegEx rule set partitions, which cannot be practically performed by human beings either outside of, or with the assistance of, a technical environment, such as a mental process or the like. The improved computing tool provides a practical application of the methodology at least in that the improved computing tool is able to distribute partitions of RegEx rules to edge devices, such as smart NICs, which have limited memory and/or data storage capacity and otherwise would not be able to perform RegEx rule set pattern matching in an intrusion detection operation due to the size and complexity of the RegEx rule set as a whole.

Figure 2:
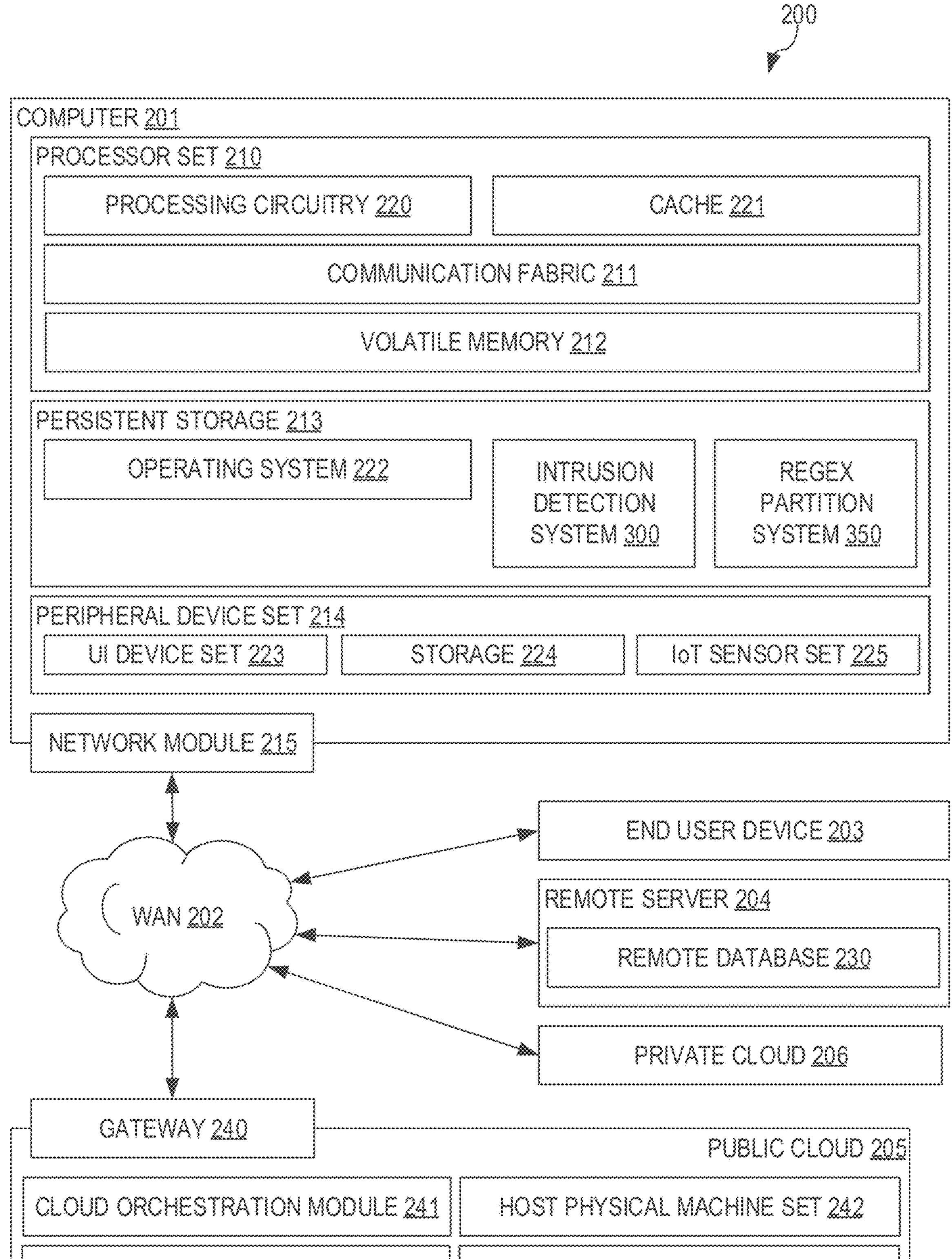
FIG. 2 is an example diagram of a distributed data processing system environment in which aspects of the illustrative embodiments may be implemented and at least some of the computer code involved in performing the inventive methods may be executed.

FIG. 2 is an example diagram of a distributed data processing system environment in which aspects of the illustrative embodiments may be implemented and at least some of the computer code involved in performing the inventive methods may be executed. That is, computing environment 200 contains an example of an environment for the execution of at least some of the computer code involved in performing the inventive methods, such as intrusion detection system (IDS) 300 and RegEx partition system 350, which are described in greater detail in FIG. 3. In addition to IDS 300 and RegEx partition system 350, computing environment 200 includes, for example, computer 201, wide area network (WAN) 202, end user device (EUD) 203, remote server 204, public cloud 205, and private cloud 206. In this embodiment, computer 201 includes processor set 210 (including processing circuitry 220 and cache 221), communication fabric 211, volatile memory 212, persistent storage 213 (including operating system 222, IDS 300 and RegEx partition system 350, as identified above), peripheral device set 214 (including user interface (UI) device set 223, storage 224, and Internet of Things (IoT) sensor set 225), and network module 215. Remote server 204 includes remote database 230. Public cloud 205 includes gateway 240, cloud orchestration module 241, host physical machine set 242, virtual machine set 243, and container set 244.

Computer 201 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 230. As is well understood in the art of computer technology, and depending upon the technology, performance of a computer-implemented method may be distributed among multiple computers and/or between multiple locations. On the other hand, in this presentation of computing environment 200, detailed discussion is focused on a single computer, specifically computer 201, to keep the presentation as simple as possible. Computer 201 may be located in a cloud, even though it is not shown in a cloud in FIG. 2. On the other hand, computer 201 is not required to be in a cloud except to any extent as may be affirmatively indicated.

Processor set 210 includes one, or more, computer processors of any type now known or to be developed in the future. Processing circuitry 220 may be distributed over multiple packages, for example, multiple, coordinated integrated circuit chips. Processing circuitry 220 may implement multiple processor threads and/or multiple processor cores. Cache 221 is memory that is located in the processor chip package(s) and is typically used for data or code that should be available for rapid access by the threads or cores running on processor set 210. Cache memories are typically organized into multiple levels depending upon relative proximity to the processing circuitry. Alternatively, some, or all, of the cache for the processor set may be located "off chip." In some computing environments, processor set 210 may be designed for working with qubits and performing quantum computing.

Computer readable program instructions are typically loaded onto computer 201 to cause a series of operational steps to be performed by processor set 210 of computer 201 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 221 and the other storage media discussed below. The program instructions, and associated data, are accessed by processor set 210 to control and direct performance of the inventive methods. In computing environment 200, at least some of the instructions for performing the inventive methods may be stored in IDS 300 and RegEx partition system 350 in one or more persistent storages 213.

Communication fabric 211 is the signal conduction paths that allow the various components of computer 201 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 212 is any type of volatile memory now known or to be developed in the future. Examples include dynamic type random access memory (RAM) or static type RAM. Typically, the volatile memory is characterized by random access, but this is not required unless affirmatively indicated. In computer 201, the volatile memory 212 is located in a single package and is internal to computer 201, but, alternatively or additionally, the volatile memory may be distributed over multiple packages and/or located externally with respect to computer 201.

Persistent storage 213 is any form of non-volatile storage for computers that is now known or to be developed in the future. The non-volatility of this storage means that the stored data is maintained regardless of whether power is being supplied to computer 201 and/or directly to persistent storage 213. Persistent storage 213 may be a read only memory (ROM), but typically at least a portion of the persistent storage allows writing of data, deletion of data and re-writing of data. Some familiar forms of persistent storage include magnetic disks and solid state storage devices. Operating system 222 may take several forms, such as various known proprietary operating systems or open source Portable Operating System Interface type operating systems that employ a kernel. The code included in IDS 300 and RegEx partition system 350 typically includes at least some of the computer code involved in performing the inventive methods.

Peripheral device set 214 includes the set of peripheral devices of computer 201. Data communication connections between the peripheral devices and the other components of computer 201 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 223 may include components such as a display screen, speaker, microphone, wearable devices (such as goggles and smart watches), keyboard, mouse, printer, touchpad, game controllers, and haptic devices. Storage 224 is external storage, such as an external hard drive, or insertable storage, such as an SD card. Storage 224 may be persistent and/or volatile. In some embodiments, storage 224 may take the form of a quantum computing storage device for storing data in the form of qubits. In embodiments where computer 201 is required to have a large amount of storage (for example, where computer 201 locally stores and manages a large database) then this storage may be provided by peripheral storage devices designed for storing very large amounts of data, such as a storage area network (SAN) that is shared by multiple, geographically distributed computers. IoT sensor set 225 is made up of sensors that can be used in Internet of Things applications. For example, one sensor may be a thermometer and another sensor may be a motion detector.

Network module 215 is the collection of computer software, hardware, and firmware that allows computer 201 to communicate with other computers through WAN 202. Network module 215 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 215 are performed on the same physical hardware device. In other embodiments (for example, embodiments that utilize software-defined networking (SDN)), the control functions and the forwarding functions of network module 215 are performed on physically separate devices, such that the control functions manage several different network hardware devices. Computer readable program instructions for performing the inventive methods can typically be downloaded to computer 201 from an external computer or external storage device through a network adapter card or network interface included in network module 215.

WAN 202 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 203 is any computer system that is used and controlled by an end user (for example, a customer of an enterprise that operates computer 201), and may take any of the forms discussed above in connection with computer 201. EUD 203 typically receives helpful and useful data from the operations of computer 201. For example, in a hypothetical case where computer 201 is designed to provide a recommendation to an end user, this recommendation would typically be communicated from network module 215 of computer 201 through WAN 202 to EUD 203. In this way, EUD 203 can display, or otherwise present, the recommendation to an end user. In some embodiments, EUD 203 may be a client device, such as thin client, heavy client, mainframe computer, desktop computer and so on.

Remote server 204 is any computer system that serves at least some data and/or functionality to computer 201. Remote server 204 may be controlled and used by the same entity that operates computer 201. Remote server 204 represents the machine(s) that collect and store helpful and useful data for use by other computers, such as computer 201. For example, in a hypothetical case where computer 201 is designed and programmed to provide a recommendation based on historical data, then this historical data may be provided to computer 201 from remote database 230 of remote server 204.

Public cloud 205 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 205 is performed by the computer hardware and/or software of cloud orchestration module 241. The computing resources provided by public cloud 205 are typically implemented by virtual computing environments that run on various computers making up the computers of host physical machine set 242, which is the universe of physical computers in and/or available to public cloud 205. The virtual computing environments (VCEs) typically take the form of virtual machines from virtual machine set 243 and/or containers from container set 244. It is understood that these VCEs may be stored as images and may be transferred among and between the various physical machine hosts, either as images or after instantiation of the VCE. Cloud orchestration module 241 manages the transfer and storage of images, deploys new instantiations of VCEs and manages active instantiations of VCE deployments. Gateway 240 is the collection of computer software, hardware, and firmware that allows public cloud 205 to communicate through WAN 202.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 206 is similar to public cloud 205, except that the computing resources are only available for use by a single enterprise. While private cloud 206 is depicted as being in communication with WAN 202, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 205 and private cloud 206 are both part of a larger hybrid cloud.

As shown in FIG. 2, one or more of the computing devices, e.g., computer 201 or remote server 204, may be specifically configured to implement an IDS 300 and RegEx partition system 350. In some illustrative embodiments, these elements 300 and 350 may be implemented in the same computing system/device or in separate computing systems/devices. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as computing device 201 or remote server 204, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates distribution of regular expression rule sets, in a balanced manner, across a plurality of edge devices having limited memory and/or data storage capacity, based on a determination of the nondeterministic finite automaton (NFA) state sizes for regular expression (RegEx) rules and an estimate of the number of states that may be saved by compiling RegEx rules together.

Figure 3:
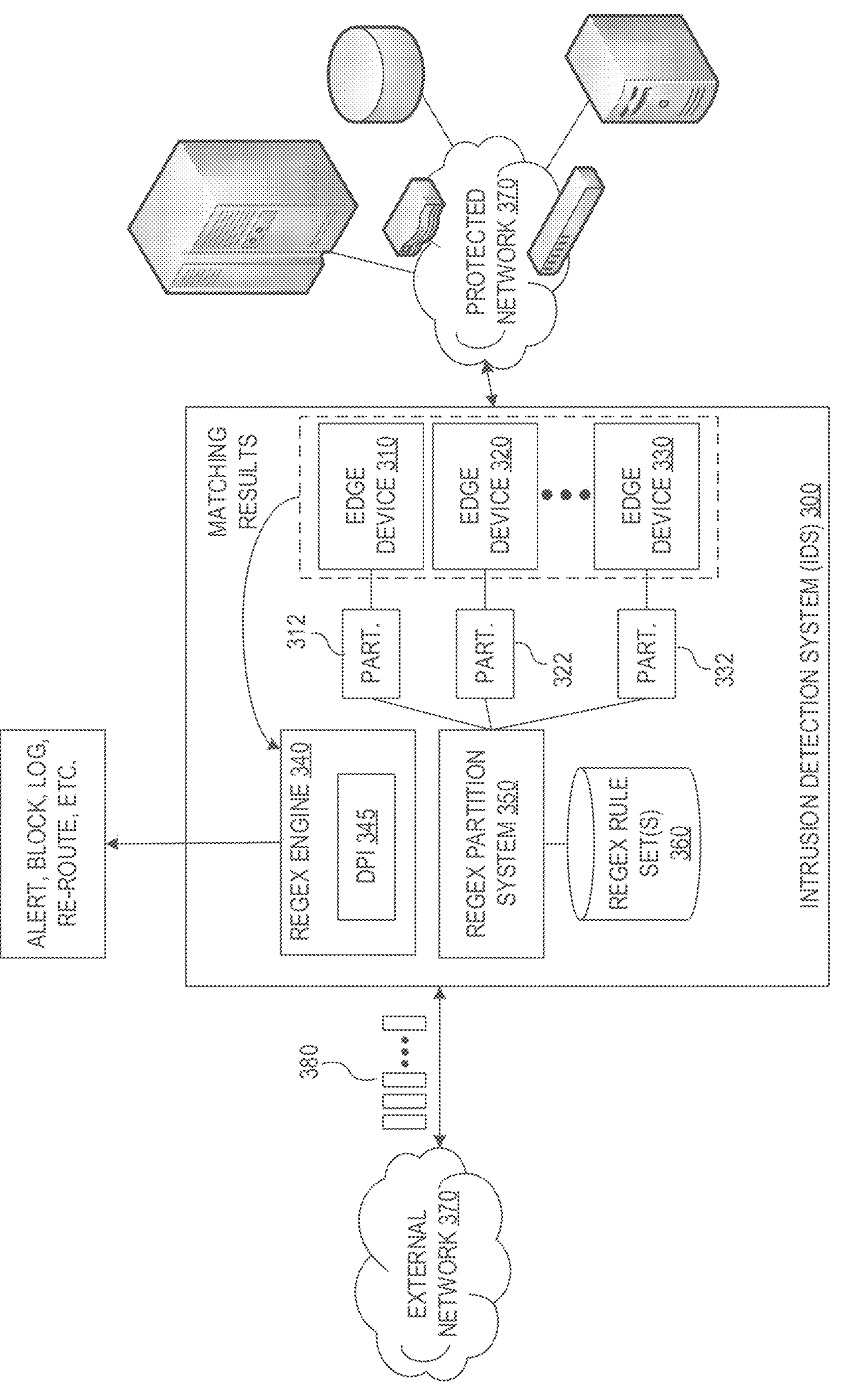
FIG. 3 is an example diagram of an IDS system with distributed RegEx partitions in accordance with one illustrative embodiment.
Figure 4:
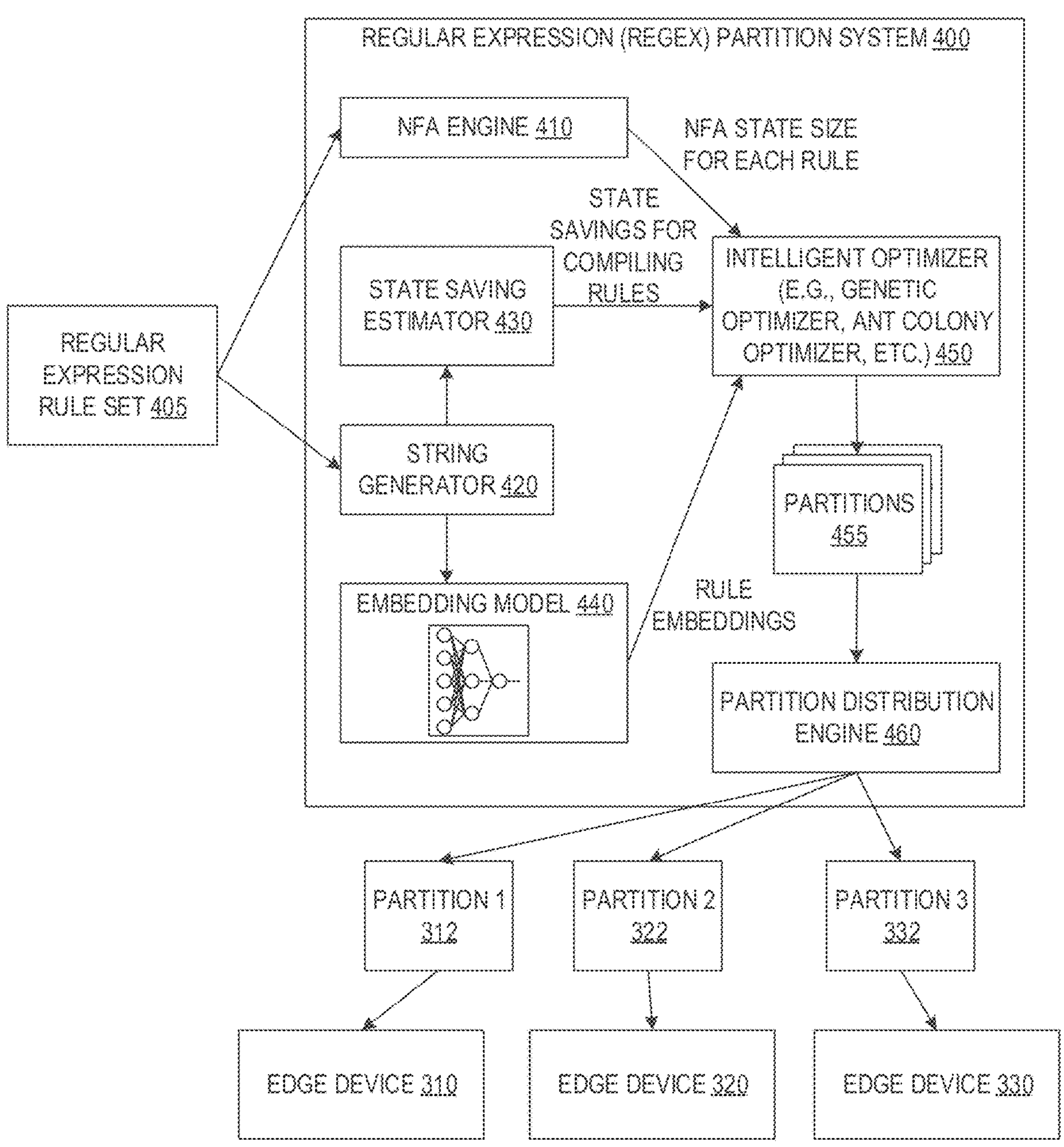
FIG. 4 is an example diagram of a RegEx partition system in accordance with one illustrative embodiment.

FIG. 3 is an example diagram of an IDS system with distributed RegEx partitions in accordance with one illustrative embodiment. FIG. 4 is an example diagram of a RegEx partition system in accordance with one illustrative embodiment. The operational components shown in FIGS. 3 and 4 may be implemented as dedicated computer hardware components, computer software executing on computer hardware which is then configured to perform the specific computer operations attributed to that component, or any combination of dedicated computer hardware and computer software configured computer hardware. It should be appreciated that these operational components perform the attributed operations automatically, without human intervention, even though inputs may be provided by human beings, e.g., search queries, and the resulting output may aid human beings. The invention is specifically directed to the automatically operating computer components directed to improving the way that regular expression (RegEx) rules for pattern matching in intrusion detection systems (IDS)

employing deep packet inspection (DPI) are applied to incoming data packets of incoming data streams, specifically by partitioning the RegEx rule set into partitions, in an intelligent manner, so that the partitions are able to be distributed to limited memory and/or data storage capacity edge devices.

With reference now to FIG. 3, an intrusion detection system (IDS) in accordance with one or more of the illustrative embodiments, utilizes a plurality of edge devices, e.g., smart network interface cards (NICs) or the like, to implement a distributed RegEx partitions in accordance with one illustrative embodiment. The IDS 300 may be implemented, for example, in one or more server computing systems and operates to protect one or more data networks 370 and its corresponding network attached devices, pass-through devices, and the logical computing resources present on these devices, e.g., virtual machines, processes, data structures, and the like. As shown in FIG. 3, the IDS 300 includes one or more edge devices, e.g., smart network interface cards (NICs) or other edge devices, 310-330 which are shown as part of the IDS 300 but in some illustrative embodiments may be part of the protected network 370 and which may be controlled or have their operations otherwise orchestrated by the IDS 300. The IDS 300 further includes a regular expression (RegEx) engine 340 comprising deep packet inspection (DPI) logic 345, a regular expression (RegEx) partition system 350, and a RegEx rule set storage 360.

The RegEx rule set storage 360 stores the RegEx rules that are to be implemented by the RegEx engine 340 when performing intrusion detection, with each RegEx rule specifying one or more RegExes that are patterns indicative of data packet payload content that may be indicative of an intrusion, attack, or other unwanted or unauthorized access of the protected network(s) 370. The DPI logic 345 of the RegEx engine 340 may perform operations to extract content from data packets and invoke the edge devices 310-330 to perform matching of the extracted content with RegEx rules in their corresponding partitions 312, 322, and 332. For example, the DPI logic 345 may extract predetermined header information, particular payload content, or the like, in accordance with the logic of a desired implementation. The DPI logic 345 may further implement logic that evaluates combinations, or patterns of matching between RegEx rules and extracted data packet content, over multiple data packets of a data stream to evaluate whether an intrusion is actually detected or not, e.g., a single data packet matching a RegEx rule may not trigger an intrusion detection, but multiple matches across multiple data packets of a data stream may instead be indicative of an intrusion based on this pattern of matches.

The RegEx rule set in the storage 360 may be partitioned by the RegEx partition system 350 to thereby balance the RegEx rule set and distribute it across the various edge devices 310-330, such that each edge device 310-330 applies a different subset of the RegEx rule set to the incoming data packets of an incoming data stream 380. The partitions 312, 322, and 332 are optimized by the RegEx partition system 350 to be of sufficiently small size as to be able to be accommodated by the limited memory and/or data storage capabilities of these edge devices 310-330, i.e., the memory/data storage limitations are considered as an optimization factor when generating the partitions 312, 322, and 332. The partitioning itself involves a process of determining nondeterministic finite automaton (NFA) state sizes for each RegEx rule in the RegEx rule set in the storage 360, an estimate of the number of states that may be saved by compiling RegEx rules together, and a vector embedding of the RegEx rules to identify groups/partitions of similar RegEx rules.

Assuming that the RegEx partition system 350 has partitioned the RegEx rule set from the storage 360 and distributed the partitions 312, 322, and 332 to the edge devices 310-330, the IDS 300 receives incoming data packets of an incoming data stream 380 and routes the incoming data packets to each of the edge devices 310-330. Again, these edge devices 310-330 are each configured with corresponding, and different, RegEx rule partitions 312, 322, and 332, in accordance with the partitioning performed by the RegEx partition system 350, such that each edge device 310-330 applies a different partition of RegEx rules to the incoming data packets of the incoming data stream 380. The edge devices 310-330 determine if there are any matches between the payloads of incoming data packets and the RegEx rules in their corresponding partitions 312, 322, and 332, and return a response indicating whether a match was or was not detected. The responses from the edge devices 310-330 are combined by the DPI logic 345 of the RegEx engine 340 to generate a final match result that is used by the RegEx engine 340 to determine an appropriate action to take regarding the incoming data stream 380. If a match is not detected, the RegEx engine 340 may simply allow the data stream to access the protected network 370 and corresponding network attached resources. If a match is detected, a corresponding action may be performed, such as generating and transmitting an alert notification, blocking the data stream 380 from accessing the protected network 370 and computing resources, logging the data from the data stream 380 and the detection of the intrusion, re-routing the data stream 380 to another computing system, e.g., an isolated or decoy computing system, or the like.

FIG. 4 is an example diagram of a RegEx partition system in accordance with one illustrative embodiment. The RegEx partition system 400 may be the RegEx partition system 350 in FIG. 3, for example. As shown in FIG. 4, the RegEx partition system 400 includes a NFA engine 410, a string generator 420, a state saving estimator 430, an embedding model 440, an intelligent optimizer 450, and a partition distribution engine 460. The RegEx partition system 400 receives a RegEx rule set 405 as input and operates to partition the RegEx rule set 405 in an intelligent manner to balance the RegEx rule set 405 across a plurality of edge devices taking into consideration the limited memory and/or data storage capacity of the edge devices. Thus, the resulting partitions, e.g., partitions 312, 322, and 332, are of sufficiently small size as to fit into the memory and data storage constraints of the edge devices 310-330. The partitioning of the RegEx rule set into partitions 312, 322, and 332 may further take into account similarities between the RegEx rules, as indicated by vector similarity measures of vector representations of these RegEx rules, as well as estimates of NFA state sizes for each RegEx rule and a number of states that may be saved by compiling RegEx rules together.

The NFA engine 410 operates to process an original set of RegEx based rules 405 and generate NFA state sizes for each RegEx based rule in the RegEx rule set 405. For example, the NFA engine 410 may implement a Thompson construction algorithm to translate one or more RegExes of one or more RegEx rules into corresponding nondeterministic finite automatons (NFA). While a Thompson construction algorithm is one option for generating such an NFA, any suitable algorithm that can generate a NFA from a RegEx may be utilized without departing from the spirit and scope of the present invention. Once the NFA is built, assuming a Thompson construction algorithm illustrative embodiment, any epsilon transitions of the NFA are removed and a state reduction operation is performed on the NFA. The resulting number of states, i.e., the state size, of the NFA is then returned as the NFA state size for the RegEx rule.

The original set of RegEx based rules 405 are also input to the string generator 420 which, for each rule, considers the rule as a set of strings by pseudo-randomly selecting strings from the RegExes of the rule, e.g., from a RegEx rule of "ab[c|d|e][f|g]" a string of "abdg" may be selected as a representative string. The representative string for each RegEx based rule may then be provided to the state saving estimator 430, or simply estimator 430, and embedding model 440. Thus, the string generator 420 receives as input the Regex rule and outputs a string which exactly matches the pattern of the Regex rule. The string generator parses the RegEx rule and where special characters are present, e.g., "*", which indicate that a corresponding sub-pattern appears arbitrary times, X number or less of the sub-pattern are sampled, e.g., where X may be any integer, such as 5 or the like. This is to make sure that the output string is not too lengthy. Moreover, if there are multiple choices, e.g., (a|b|c) where there are 3 choices, one of the choices may be uniformly taken to be the output. For example, given a RegEx of "ab(c|d|e)(f|g)*, and assuming a sampling of 3 for the special character "*", for the two sub-expressions (c|d|e) and (f|g){3}, the string generator 420 may sample out d, gfg. Thus, the final output of the string generator 420 may be "abdgfg."

The estimator 430 estimates the number of states that may be saved by compiling RegEx based rules together in a group/partition. That is, for each pair of RegExes r1, 42, their corresponding random strings generated by the string generator are s11, . . . , s1k, s21, . . . , s2k. In some illustrative embodiments, the number of states that can be saved by compiling r1 and r2 together is estimated by a function of the type $$\frac{1}{k^2}\sum_{i=1}^{k}\sum_{j=1}^{k}LCS(s_{1i}, s_{2j}),$$

where the longest common subsequence (LCS) is the longest subsequence common to all sequences in a set of sequences, e.g., s11, . . . , s1k, s21, . . . , s2k, and k is the number of strings generated from each of the RegExes. The average length of the LCSs is the number of saved states.

Thus, in some illustrative embodiments, the estimator 430 receives as input to RegEx rules r1, 42 and outputs an approximation m(r1, r2) of n(r1)+n(r2)−n(r1|r2), which is referred to as the number of saved states for r1, r2. To generate this approximation, for each RegEx rule, the estimator 430 samples s strings matching the RegEx by implementing the pseudo-random matched string generator 420 and computing the length of LCS for each pairing of strings of the first RegEx (s) and strings of the second RegEx (t). The average length of these LCSs is then determined and returned as the number of saved states.

The embedding model 440, in accordance with some illustrative embodiments, is a computer model employing a Doc2Vec structure with a Continuous Bag of Words (CBOW) that is trained to learn how to predict a missing token using similarity. That is, the RegExes are parsed into tokens and, similar to Doc2Vec, the tokens are transformed into indicator vectors. For example, assume that there are 3 tokens, these tokens are transformed into (1, 0, 0), (0, 1, 0), and (0, 0, 1). The embedding model 440 is trained on these vectors of the tokens to predict missing tokens. Thus, the embedding model 440 is given the nearby tokens and a paragraph vector, and is asked to predict the correct token.

This may be done for a training data set of RegEx rules, with appropriate machine learning training of the embedding model 440 to cause the embedding model 440 to predict a next token given an input sequence of tokens, and thereby learning an embedding of tokens. The trained embedding model 440 may then be applied to new RegEx rules, e.g., RegEx rules in the set 405, to generate vector representations of the RegEx rules 405 which can then be used with vector representation of the RegEx rules present in the various groups/partitions to identify a group/partition to which to assign the new RegEx rule, such as by evaluating a vector similarity metric or distance metric, and finding the smallest distance or greatest similarity between the vectors. These tokens may be any meaningful pattern of content that may be present in a data packet, such as in the headers, payload, or the like.

The results generated by the NFA engine 410, the estimator 430, and the embedding model 440 are input to the intelligent optimizer 450 which generates RegEx rule partitions 455 based on these inputs. In some illustrative embodiments, the intelligent optimization engine optimizes the partitions 455 so that they are able to be implemented in the limited size memory/data storage of the edge devices. In some illustrative embodiments, this optimization by the intelligent optimizer 450 may apply a genetic algorithm or an ant colony algorithm to the set of RegEx rules 405 to generate a plurality of groups/partitions of the RegEx rules 405. Of course, other suitable optimization algorithms may also, or alternatively, be utilized without departing from the spirit and scope of the present invention. In the present case, the optimization problem is the partitioning of an input RegEx rule set and the optimization algorithms, e.g., the genetic/ant colony algorithms, operate on the set of RegEx rules 405 to determine an optimum set of partitions of RegExes that can be processed at different ones of the edge devices, i.e., a distribution of partitions of RegExes.

In some illustrative embodiments, the intelligent optimizer 450 receives as input the number of states of all RegEx rules, the number of saved states for all pairs of RegExes in the RegEx set, and the desired number of partitions p. The intelligent optimizer 450 outputs the set of partitions of RegExes p of the RegEx set. The intelligent optimizer 450, in generating the partitions, first constructs a weighted graph of the set of RegEx rules. That is, for each RegEx, a node is generated and p more nodes (for each partition p) such that the graph has n nodes where n is the number of RegExs in the set of Regex rules. The weight of two nodes is given by n(r1)/2+n(r2)/2−m(r1, r2), where r1 and 42 are the corresponding RegEx rules for the nodes.

An optimization algorithm, such as an Ant Colony Optimization (ACO), is applied to the weighted graph. In applying the ACO algorithm, for example, the pheromone matrix M has all entries being 1 initially. Thereafter, random walks are performed on the graph a predetermined number of times, e.g., 5n times. Assume that at some moment, the random walk is on the vertex v, the probability to choose the next non-visited vertex k is M[v, k]/(M[v, k1]+M[v, k2]+ . . . ), where the denominator is the sum over all indices of non-visited vertices. For each walk, p−1 positions are sampled randomly to separate the walk into p cycles. The cost of each random walk is computed along with the sum of lengths of p cycles, and sorted. For example, if the i-th walk has length Li, then the pheromone matrix is updated by the formula M[i, j]=0.99*M[i, j]+sum(n/(Li*i)). During the application of the ACO algorithm, the best partitioning solution is recorded and returned as the output.

The RegEx rule partitions 455 may then be distributed by the partition distribution engine 460 to different edge devices 310-330 for implementation as part of IDS 300 and provide match results back to the RegEx engine for evaluating input data packets of input data streams, e.g., input data stream 380, based on their respective RegEx rule partitions. The partition distribution engine 460 comprises logic for interacting with the edge devices 310-330 to configure the edge devices 310-330 to implement different partitions of the RegEx rule set 405 in accordance with the optimized partitioning generated by the intelligent optimizer 450. As shown in FIG. 4, for example, each of the partitions 1, 2, and 3 are sent to corresponding edge devices 310, 320, and 330, such that each edge device is configured to apply the partition that is transmitted to it, e.g., edge device 310 is configured to apply partition 1 whereas edge device 320 is configured to apply partition 2. These partitions comprise different sub-portions of the RegEx rule set 405 and thus, are different from other partitions. Each of the edge devices 310-330, in applying their corresponding partition to input data packets of an input data stream, generate separate results as to whether the input data packets have content matching any of the RegEx rules in their corresponding partition. By compiling the responses from each edge device, a single result may be generated indicating whether any of the RegEx rules in the set 405 are matched by the content of incoming data packets and thus, an intrusion or attack is detected.

Thus, again, the illustrative embodiments provide an improved computing tool and improved computing tool operations/functionality for distributing a RegEx rule set to a plurality of edge devices, e.g., smart network interface cards, that have limited memory and/or data storage capacity, by partitioning the RegEx rule set according to an estimate of the number of states that may be saved by compiling RegEx rules together and a determination of NFA state size for each RegEx rule, using RegEx rule embeddings. The edge devices apply their corresponding distinct partitions to incoming data streams, where the incoming data stream is sent to each of the edge devices. The edge devices determining matches between payload data of incoming data packets and the RegExes of their corresponding RegEx rule partition. The results from each edge device are combined in a RegEx engine or deep packet inspection (DPI) logic to determine whether any of the edge devices detect a match, i.e., a data packet has a payload matching a RegEx pattern. An appropriate action is then performed based on whether or not a match is identified, e.g., generating and transmitting an alert notification, blocking the data stream, re-routing the data stream, logging the data, etc.

It should be appreciated that while the illustrative embodiments are described in terms of incoming data packets of incoming data streams, this terminology is referencing the data packets and data stream being incoming to the IDS system, whether from a source external to the protected network or from the protected network itself. That is, data packets may flow into or out of the protected network and both streams may be processed by the IDS system to detect a potential intrusion or attack. For example, for data streams flowing out of the protected network, the IDS system may evaluate them using the partitioned RegEx rule set to detect instances where particular protected data is being extracted from the protected network, for example. Moreover, in some cases, the illustrative embodiments may operate on data streams that are entirely internal to the protected network, such as in the case of a white box or gray box intrusion or attack. Thus, the illustrative embodiments are not limited to evaluating data streams flowing into a protected network from an external source, such as may be the case in black box attacks.

Figure 5:
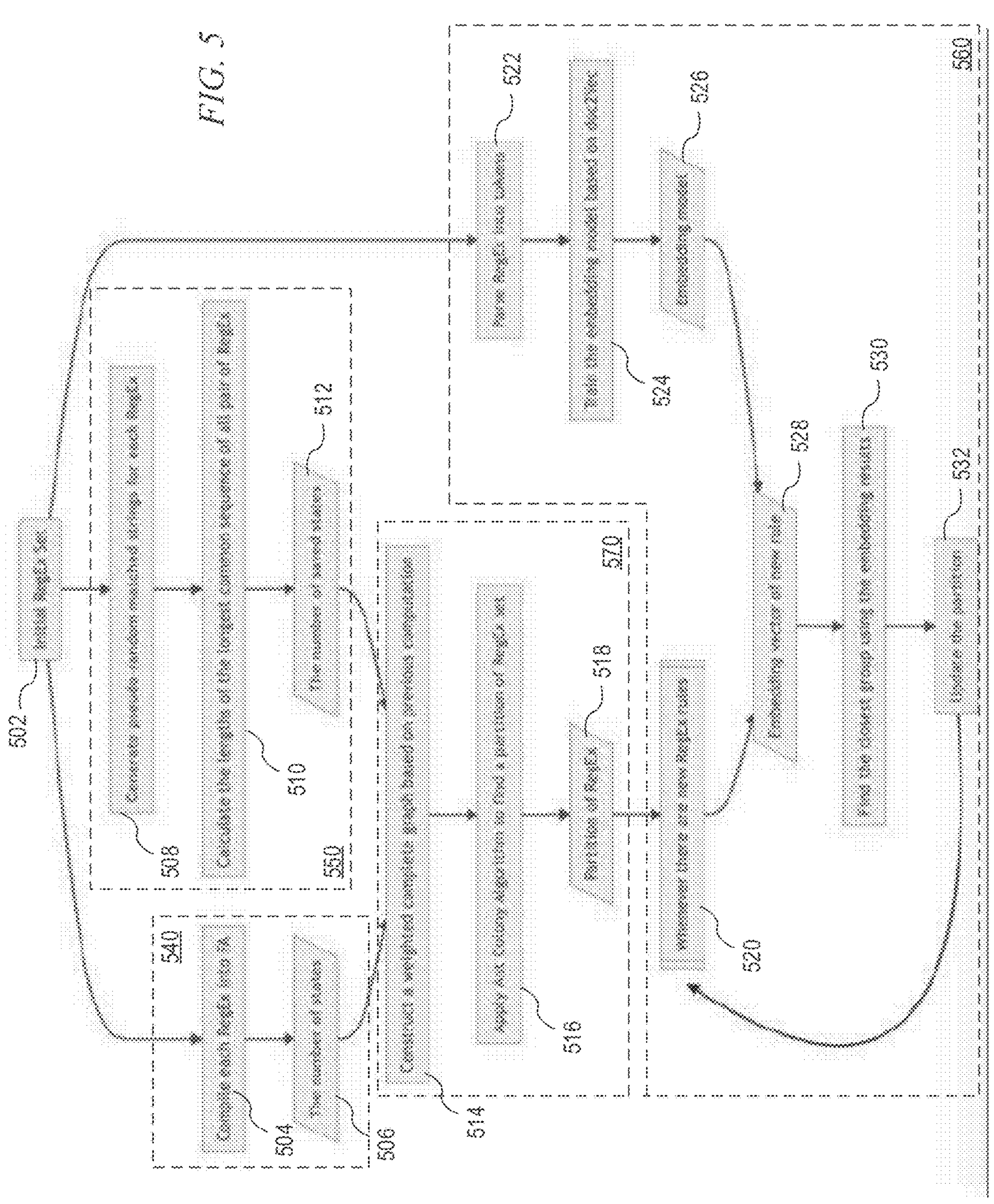
FIG. 5 is a flowchart outlining an example operation of a RegEx partition system in accordance with one illustrative embodiment.

FIG. 5 presents a flowchart outlining example operations of elements of the present invention with regard to one or more illustrative embodiments. It should be appreciated that the operations outlined in FIG. 5 are specifically performed automatically by an improved computer tool of the illustrative embodiments and are not intended to be, and cannot practically be, performed by human beings either as mental processes or by organizing human activity. To the contrary, while human beings may, in some cases, initiate the performance of the operations set forth in FIG. 5, and may, in some cases, make use of the results generated as a consequence of the operations set forth in FIG. 5, the operations in FIG. 5 themselves are specifically performed by the improved computing tool in an automated manner.

FIG. 5 is a flowchart outlining an example operation of a RegEx partition system in accordance with one illustrative embodiment. As shown in FIG. 5, there are three main branches of the operation of the RegEx partition system 540, 550, and 560 which come together at operations 514 and 528. The first branch of operation 540 may be performed, for example, by the NFA engine 410 in FIG. 4, for generating the NFA state size for each rule, e.g., the number of states for each RegEx rule in the RegEx rule set. The second branch of operation 550 may be performed, for example, by the state saving estimator 430 in FIG. 4 to determine an estimate state savings for compiling RegEx rules together. The third branch of operation 560 may be performed by the embedding model 440 in FIG. 4 to train and generate embedding vectors for RegEx rules and identify corresponding partitions into which to assign new RegEx rules. A fourth operation 570 may be performed by the intelligent optimizer 450 in FIG. 4 to generate the partitions for distribution to the edge devices.

As shown in FIG. 5, the operation starts by receiving an initial regular expression rule set (step 502). Following the first branch of operation 540, each RegEx rule is compiled into a nondeterministic finite automaton (NFA) (step 504) and a number of states of the NFA for each rule is determined (step 506). In the second branch of operation 550, the RegEx rule set is used as a basis for generating pseudo-random matches strings for each RegEx rule (step 508). The lengths of the longest common sequence of all pairings of RegEx rules in the set are then calculated (step 510) and a number of saved states is determined (step 512). The results from steps 506 and 512 are then used, in the fourth operation 570, to construct a weighted graph (step 514). The weighted graph is then used as a basis for an optimization algorithm, e.g., genetic optimization, ant colony optimization, or the like, to find one or more partitions for the RegEx set (step 516). The RegEx partitions are then generated (step 518) and evaluated to determine if there are any new RegEx rules (step 520).

In the third operation 560, If new RegEx rules are encountered in step 520, they are processed by the trained embedding model to generate a vector representation of the new RegEx rule (step 528) and these vectors are used to place the new RegEx rules into corresponding partitions using similarity metrics between vector representations of the new RegEx and the average of the other RegExes in a partition. That is, the training of the embedding model involves parsing the RegEx rules into tokens (step 522) and training the embedding model based on these tokens, such as by implementing a doc2vec algorithm, CBOW, and/or the like (step 524). The resulting embedding model (step 526) is then applied in step 528 to generate the vector representation for the new RegEx rule.

The vector representation for the new RegEx rule is then used as a basis for identifying a closest group/partition (step 530). For example, a vector similarity or distance metric and one or more thresholds may be used to identify which existing group/partition to assign the new RegEx rule to, or whether a new group/partition should be generated, as in the case where the vector similarity/distance does not meet minimum requirements specified by the thresholds. The groups/partitions are then updated accordingly (step 532), and the operation terminates.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, for intrusion detection based on regular expression matching, the method comprising:

partitioning a regular expression (RegEx) rule set into a plurality of different partitions;

wherein partitioning the RegEx rule set comprises:

determining a number of states in each RegEx rule of the RegEx rule set;

predicting a number of saved states that are to be saved by compiling at least two RegEx rules in the RegEx rule set together; and inputting into at least one optimization algorithm the number of states in each RegEx rule of the RegEx rule set, the number of saved states, and a number of desired partitions in order to generate partitions based on the number of states in each RegEx rule, the number of saved states, and the number of desired partitions, wherein predicting the number of saved states comprises, for each pairing of a RegEx rule in the RegEx rule set to each other RegEx rule in the RegEx rule set, computing a length of a longest common sequence, and wherein an average length of the lengths of the longest common sequences is determined and returned as the number of saved states that are input into the at least one optimization algorithm;

distributing the plurality of different partitions to a plurality of different edge computing devices associated with a protected network of computing resources, wherein the plurality of different edge computing devices comprise smart network interface cards;

routing data packets of an incoming data stream to the plurality of edge computing devices, wherein each edge computing device in the plurality of edge computing devices, processes the data packets to determine whether the data packets match RegEx rules in a partition distributed to the edge computing device; and determining whether the incoming data stream represents an intrusion based on a combination of results of the processing of the data packets by the plurality of edge computing devices.

2. The method of claim 1, wherein partitioning the RegEx rule set further comprises:

generating a weighted graph based on the number of states and the number of saved states; and applying the at least one optimization algorithm to the weighted graph to generate the plurality of different partitions.

3. The method of claim 2, wherein the at least one optimization algorithm comprises at least one of a genetic optimization algorithm or an ant colony optimization algorithm.

4. The method of claim 1, further comprising, for each RegEx in the RegEx rule set, pseudo-randomly matching a string to the RegEx, to thereby generate a set of one or more strings for each RegEx rule.

5. The method of claim 1, wherein generating a number of states comprises:

building a nondeterministic finite automaton (NFA);

performing a state reduction operation on the NFA; and determining a number of states of the NFA after performance of the state reduction operation.

6. The method of claim 1, wherein the partitions in the plurality of different partitions are generated to have a size that fits within a memory or data storage capacity of the edge computing devices.

7. A computer program product comprising a computer readable storage medium having a computer readable program stored in a data processing system, that causes the data processing system to:

partition a regular expression (RegEx) rule set into a plurality of different partitions;

wherein partitioning the RegEx rule set comprises:

determining a number of states in each RegEx rule of the RegEx rule set;

predicting a number of saved states that are to be saved by compiling at least two RegEx rules in the RegEx rule set together; and inputting into at least one optimization algorithm the number of states in each RegEx rule of the RegEx rule set, the number of saved states, and a number of desired partitions in order to generate partitions based on the number of states in each RegEx rule, the number of saved states, and the number of desired partitions, wherein predicting the number of saved states comprises, for each pairing of a RegEx rule in the RegEx rule set to each other RegEx rule in the RegEx rule set, computing a length of a longest common sequence, and wherein an average length of the lengths of the longest common sequences is determined and returned as the number of saved states that are input into the at least one optimization algorithm;

distribute the plurality of different partitions to a plurality of different edge computing devices associated with a protected network of computing resources, wherein the plurality of different edge computing devices comprise smart network interface cards;

route data packets of an incoming data stream to the plurality of edge computing devices, wherein each edge computing device in the plurality of edge computing devices, processes the data packets to determine whether the data packets match RegEx rules in a partition distributed to the edge computing device; and determine whether the incoming data stream represents an intrusion based on a combination of results of the processing of the data packets by the plurality of edge computing devices.

8. The computer program product of claim 7, wherein partitioning the RegEx rule set further comprises:

generating a weighted graph based on the number of states and the number of saved states; and applying the at least one optimization algorithm to the weighted graph to generate the plurality of different partitions.

9. The computer program product of claim 8, wherein the at least one optimization algorithm comprises at least one of a genetic optimization algorithm or an ant colony optimization algorithm.

10. The computer program product of claim 7, wherein the computer readable program further causes the data processing system to, for each RegEx in the RegEx rule set, pseudo-randomly match a string to the RegEx, to thereby generate a set of one or more strings for each RegEx rule.

11. The computer program product of claim 7, wherein generating a number of states comprises:

building a nondeterministic finite automaton (NFA);

performing a state reduction operation on the NFA; and determining a number of states of the NFA after performance of the state reduction operation.

12. The computer program product of claim 7, wherein the partitions in the plurality of different partitions are generated to have a size that fits within a memory or data storage capacity of the edge computing devices.

13. An apparatus comprising:

at least one processor; and at least one memory coupled to the at least one processor, wherein the at least one memory comprises instructions which, when executed by the at least one processor, cause the at least one processor to:

partition a regular expression (RegEx) rule set into a plurality of different partitions;

wherein partitioning the RegEx rule set comprises:

determining a number of states in each RegEx rule of the RegEx rule set;

predicting a number of saved states that may be saved by compiling at least two RegEx rules in the RegEx rule set together; and inputting into at least one optimization algorithm the number of states in each RegEx rule of the RegEx rule set, the number of saved states, and a number of desired partitions in order to generate partitions based on the number of states in each RegEx rule, the number of saved states, and the number of desired partitions, wherein predicting the number of saved states comprises, for each pairing of a RegEx rule in the RegEx rule set to each other RegEx rule in the RegEx rule set, computing a length of a longest common sequence, and wherein an average length of the lengths of the longest common sequences is determined and returned as the number of saved states that are input into the at least one optimization algorithm;

distribute the plurality of different partitions to a plurality of different edge computing devices associated with a protected network of computing resources, wherein the plurality of different edge computing devices comprise smart network interface cards;

route data packets of an incoming data stream to the plurality of edge computing devices, wherein each edge computing device in the plurality of edge computing devices, processes the data packets to determine whether the data packets match RegEx rules in a partition distributed to the edge computing device; and determine whether the incoming data stream represents an intrusion based on a combination of results of the processing of the data packets by the plurality of edge computing devices.

14. The apparatus of claim 13, wherein partitioning the RegEx rule set further comprises:

generating a weighted graph based on the number of states and the number of saved states; and applying the at least one optimization algorithm to the weighted graph to generate the plurality of different partitions.

15. The apparatus of claim 14, wherein the at least one optimization algorithm comprises at least one of a genetic optimization algorithm or an ant colony optimization algorithm.

16. The apparatus of claim 13, wherein the instructions further cause the processor to, for each RegEx in the RegEx rule set, pseudo-randomly match a string to the RegEx, to thereby generate a set of one or more strings for each RegEx rule.

17. The apparatus of claim 13, wherein generating a number of states comprises:

building a nondeterministic finite automaton (NFA);

performing a state reduction operation on the NFA; and determining a number of states of the NFA after performance of the state reduction operation.

* * * * *